US010948998B2

(12) United States Patent
Wackers et al.

(10) Patent No.: US 10,948,998 B2
(45) Date of Patent: *Mar. 16, 2021

(54) HUMAN INTERFACE DEVICE

(71) Applicant: INTERLINK ELECTRONICS, INC., Westlake Village, CA (US)

(72) Inventors: Christiaan Anna Maria Wackers, Singapore (SG); Chee Wai Lu, Singapore (SG); Hock Cheng Ng, Singapore (SG); Wai Jye Chan, Singapore (SG)

(73) Assignee: INTERLINK ELECTRONICS, INC., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,798

(22) Filed: Sep. 10, 2019

(65) Prior Publication Data

US 2020/0026364 A1    Jan. 23, 2020

Related U.S. Application Data

(63) Continuation of application No. 16/272,927, filed on Feb. 11, 2019, now Pat. No. 10,409,389, which is a continuation of application No. 15/744,703, filed as application No. PCT/US2016/042368 on Jul. 14, 2016, now Pat. No. 10,203,767.

(30) Foreign Application Priority Data

Jul. 14, 2015  (SG) .............. 10201505554T

(51) Int. Cl.
  *G06F 3/02*      (2006.01)
  *G06F 3/0354*    (2013.01)
  *G06F 3/023*     (2006.01)

(52) U.S. Cl.
  CPC .......... *G06F 3/0202* (2013.01); *G06F 3/0233* (2013.01); *G06F 3/03547* (2013.01)

(58) Field of Classification Search
  CPC ... G06F 3/0202; G06F 3/0233; G06F 3/03547
  See application file for complete search history.

(56) References Cited

U.S. PATENT DOCUMENTS

| | | | |
|---|---|---|---|
| 5,675,329 A | 10/1997 | Barker | |
| 10,203,767 B2 * | 2/2019 | Wackers | ............... G06F 3/0233 |
| 10,409,389 B2 * | 9/2019 | Wackers | ............. G06F 3/03547 |
| 2005/0247548 A1 | 11/2005 | Levy | |
| 2013/0229347 A1 | 9/2013 | Lutz, III et al. | |
| 2014/0078063 A1 | 3/2014 | Bathiche et al. | |
| 2014/0333579 A1 | 11/2014 | Sleeman et al. | |

* cited by examiner

*Primary Examiner* — Curtis B Odom
(74) *Attorney, Agent, or Firm* — Maschoff Brennan

(57) ABSTRACT

A system includes a surface having a demarcated area and discrete areas disposed on the surface. The discrete areas may each be configured to receive user input. At least a portion of the discrete areas overlap the demarcated area. The system further includes a sensing layer disposed underneath the surface. The sensing layer may be configured to sense force applied to the surface in response to the user input.

20 Claims, 9 Drawing Sheets

HUMAN INTERFACE DEVICE

CROSS-REFERENCE TO RELATED APPLICATIONS

This patent application is a continuation application of U.S. patent application Ser. No. 16/272,927, filed Feb. 11, 2019, which is a continuation application and claims the benefit of U.S. National Stage patent application Ser. No. 15/744,703, filed Jan. 25, 2018, and entitled "HUMAN INTERFACE DEVICE"; which claims the benefit of the filing date of International Patent Application No. PCT/US2016/042368, filed Jul. 14, 2016, and also entitled, "HUMAN INTERFACE DEVICE", which claims priority to a Singapore Patent Application No. 10201505554T, filed on Jul. 15, 2015; all of which are incorporated by reference in their entirety.

TECHNICAL FIELD

The present disclosure generally relates to a human interface device for a computing device. More particularly, aspects of the present disclosure are directed to a human interface device (HID) or user input device that is configured for use with a computing device or computing system.

BACKGROUND

Many computing devices (e.g. laptops, notebooks, ultrabooks, tablets, and personal computers) for consumers use or are integrated with human interface devices (HIDs). Such interface devices are configured for communicating user input to the computing devices, and may thus also be known as user interface devices. Examples of such user interface devices or HIDs are keyboards, touchpads, mousepads, mice, joysticks, and the like. In most computer systems, each HID is distinct and separate from one another. For example, in a typical home computer system, the computer system includes a keyboard that is separate from a mouse. The keyboard and the mouse are independent components that perform their own unique functions. In another example of a typical laptop or notebook, the laptop comprises or is integrated with a keyboard and a separate touchpad. The keyboard is configured to receive user input via keys of the keyboard, while the touchpad is configured to emulate a mouse to provide mouse cursor functions in response to user input. Like the home computer system, in a laptop configuration, the touchpad is disposed at a separate location from the keyboard, usually forward (relative to the screen) of the keyboard.

One example product of a HID where the keyboard and the touchpad are located at distinct positions is the Microsoft Touch Cover 2. The product is coupleable to a second device, such as the Microsoft Surface, for providing user input for the second device. Thus, user input received by the Microsoft Touch Cover 2 is transmitted as input signals to the Microsoft Surface. In the Microsoft Touch Cover 2 product, the keyboard area and the touchpad area are separate from each other. In order to use the mouse cursor or to utilize the mouse function, the user needs to move his hands from the keyboard area to the touchpad area. One problem associated with this product is that the user needs to move his hands over a distance in order to switch from keyboard mode to mouse mode.

United States Patent Publication No. 2014/0078063 discloses a keyboard device having gesture-initiated functions. The keyboard device includes multiple keys that are touch-sensitive. There are multiple pressure-sensitive touch sensors for detecting actuations on the keys of the keyboard. Actuation on each key transmits an input signal associated with the key to a computer. Additionally, a user can perform gestures across the keys in order to perform different functions, such as shortcuts. However, it is necessary for the user to provide user input on at least one of the keys in order to perform any functions. If the user presses a region outside of a discrete key, the device would not be able to detect the user input. Further, in this device, there is a risk of the user accidentally typing a key when the user intends to perform a gesture across the keys.

Therefore, in order to address or alleviate at least one of the aforementioned problems and/or disadvantages, there is a need to provide a human interface device in which there are at least some improved features over conventional approaches, such as those described above.

SUMMARY

According to an aspect of the present disclosure, a human interface device (HID) includes a surface having a demarcated area and discrete areas disposed on the surface. The discrete areas may each be configured to receive user input. At least a portion of the discrete areas overlap the demarcated area. The HID further includes a sensing layer disposed underneath the surface. The sensing layer may be configured to sense force applied to the surface in response to the user input.

DETAILED DESCRIPTION

For purposes of brevity and clarity, descriptions of embodiments of the present disclosure are directed to a human interface device. While aspects of the present disclosure will be described in conjunction with the embodiments provided herein and in view of the FIGS., it will be understood that the described or illustrated embodiments are not intended to limit the present disclosure to these embodiments. In the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, well-known systems, methods, procedures, and components have not been described in detail as not to unnecessarily obscure aspects of the embodiments of the present disclosure.

Some additional details of these and other embodiments are discussed with respect to the appended figures in which commonly labeled items indicate similar structures unless described otherwise. The drawings are diagrammatic and schematic representations of some embodiments, and are not meant to be limiting, nor are they necessarily drawn to scale. Throughout the drawings, like numbers generally reference like structures unless described otherwise.

A human interface device is described hereinafter in accordance with representative or example embodiments of the present disclosure.

Figure 1:
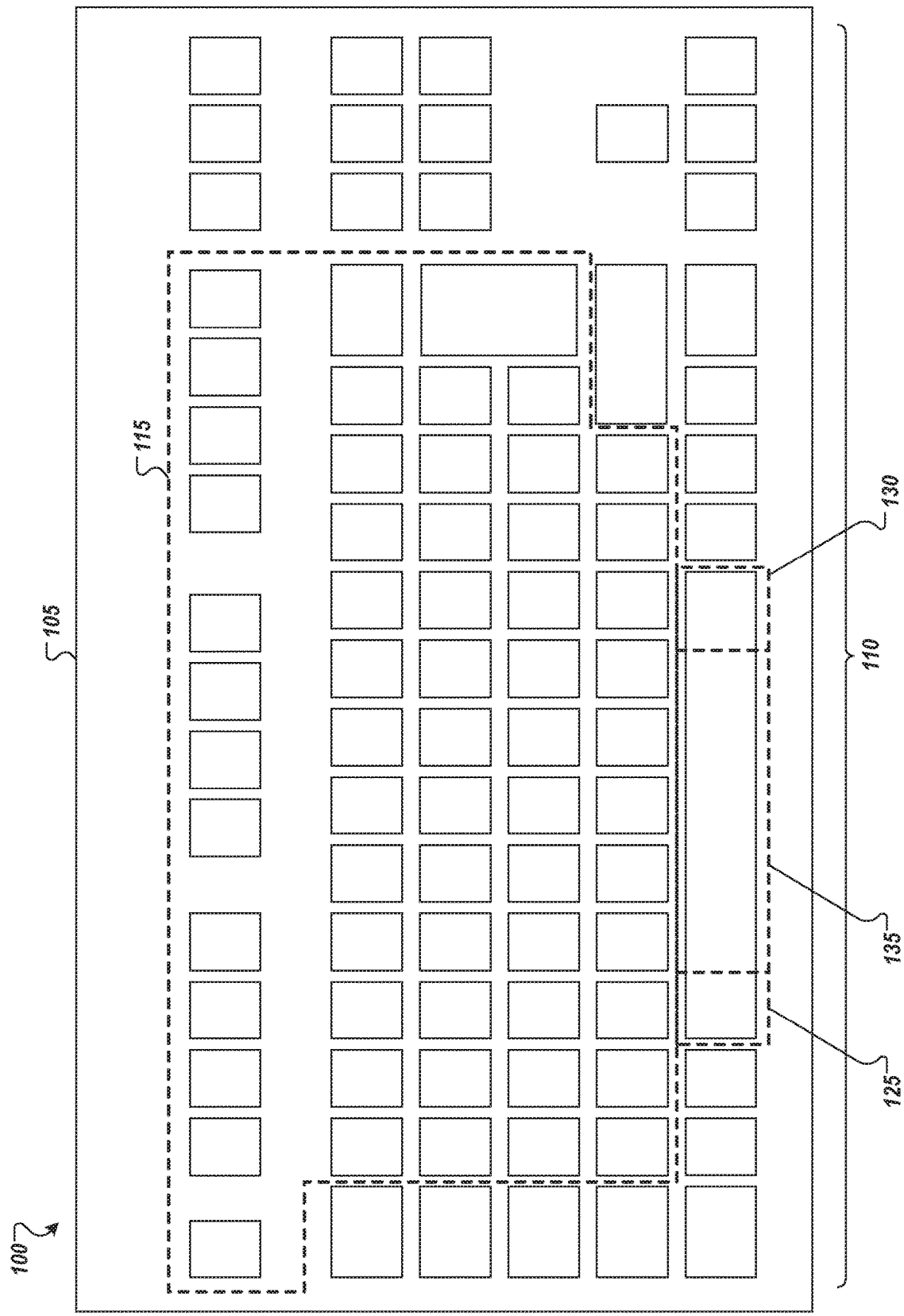
FIG. 1 shows an example layout of a human interface device (HID)

FIG. 1 shows an example layout of a human interface device (HID) 100. The HID 100 includes a keyboard 105 that is configured to receive user input. As used in the context of this disclosure, the keyboard 105 is defined to include an input device having a panel or a board with a set of keys 110 configured to receive user input. The keyboard 105 may include a demarcated area 115.

The set of keys 110 may include multiple keys which may be arranged in tiers. In at least one embodiment, the set of keys 110 may include a set of pressable buttons. The set of keys 110 may also include a set of divisions that each correspond to a particular key. The keyboard 105 may include a substantially flat surface with markings that designate the set of keys 100. For example, the set of keys 110 may be painted, printed, etched, or otherwise indicated on or near the surface of the keyboard 105.

The demarcated area 115 may refer to an area of the keyboard 105 that is associated with a sensing layer (as further described below). User input provided within the demarcated area 115 may correspond to various functions. For example, a user "press" on a particular key associated with a particular letter "A" within the demarcated area 115 may correspond to an output signal being generated to render a letter "A" on a display device. In another example, a user gesture, such as a press and hold, swipe, long press, or any other type of gesture, may correspond to a different output, such as a "back" function for a browser, an activation of a menu (e.g., similar to a "right click" of a mouse, etc.).

The demarcated area 115 and the set of keys 110 may overlap each other, such that at least some of the set of keys 110 are disposed or positioned or located within the demarcated area 115. Each discrete key on the keyboard 105 may correspond to a different function or output, such as an alphanumeric character, a "Shift" key, a "Ctrl" key, etc.

One of the set of keys 110 may include a spacebar key 120. The spacebar key 120 may be configured to emulate mouse functions in some instances. For example, the spacebar key 120 may include one or more regions in which a user may provide input that corresponds to a mouse function. In an example, a left end 125 of the spacebar key 120 may be configured to emulate a left mouse button, and a right end 130 of the spacebar key may be configured to emulate a right mouse button. A center portion 135 of the spacebar key may retain a conventional function of a typical spacebar on a keyboard.

The HID 100 may further include a sensing layer disposed underneath the keys 110 of the keyboard 105. The sensing layer may include multiple sensing elements configured to detect user input. The sensing elements, for example, may include pressure or force sensing elements. As readily understood by the skilled person, pressure is associated with force and area. Thus, it would be apparent to the skilled person that the sensing layer, the sensing elements, and other pressure-related components, may also be interpreted as being force-sensitive or force-sensing. The sensing layer is further described with respect to FIGS. 2, 3A, 3B, 3C, 4A and 4B FIG. 2 illustrates a block diagram of an example sensing layer 200. The sensing layer 200 may be configured to attach or couple to an underside of a keyboard (e.g., the keyboard 105 of FIG. 1). The underside of the keyboard may refer to a side of the keyboard that is opposite a set of keys.

Figure 2:
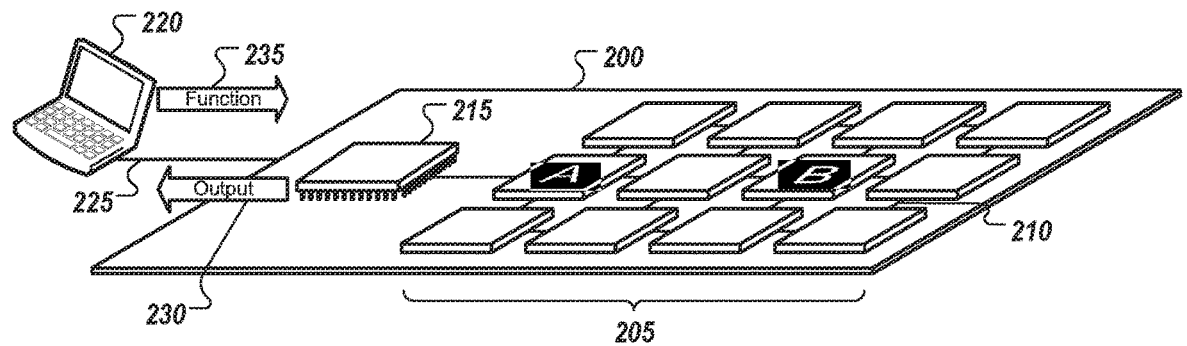
FIG. 2 illustrates a block diagram of an example sensing layer.

The sensing layer 200 may include one or more sensing elements 205. As illustrated, the sensing layer 200 may include an array of twelve sensing elements 205, arranged in three columns and four rows. Any number of sensing elements 205 may be included in the sensing layer 200 and in any configuration. For example, FIG. 2 illustrates twelve equally spaced sensing elements 205. Any type of spacing scheme is contemplated. In at least one embodiment, the sensing elements 205 may be arranged in accordance with a layout of a keyboard. For example, some or all of the sensing elements 205 may correspond to a particular key on the keyboard. Each of the sensing elements 205 that corresponds to a particular key may be arranged to substantially align with the respective key. In at least one embodiment, some sensing elements 205 may not correspond to a key on the keyboard. Such sensing elements 205 may be referred to as interstitial sensing elements. The interstitial sensing elements may be configured to receive user input that is not intended to active a particular key of the keyboard.

The sensing elements 205 may be electronically coupled to each other and/or electronically coupled to a processor 215 via a set of leads 210. The processor 215 may include an on-chip memory or may be coupled to an external data storage. The processor 215 may communicate with a client device 220 via a network 225.

The client device 220 may include a processor-based computing system. The client device 220 may include memory, a processor, and network communication capabilities. The client device 220 may be capable of communicating data (e.g., a function) and receiving data (e.g., output, such as user input received via the keyboard) and information to and from a keyboard and/or the sensing layer 200 via the network 225. Some examples of the client device 220 may include a mobile phone, a smartphone, a tablet computer, a laptop computer, a desktop computer, a set-top box, a television, a monitor, a display device, a virtual-reality device, or a connected device, etc.

The network 225 may include a wired network, a wireless network, or any combination thereof. The network 225 may include any suitable topology, configuration or configurations including a star configuration, token ring configuration, or other configurations. The network 225 may include a local area network (LAN), a wide area network (WAN) (e.g., the Internet), and/or other interconnected data paths across which multiple devices may communicate. In some embodiments, the network 225 may include a peer-to-peer network. The network 225 may also be coupled to or include portions of a telecommunications network that may enable communication of data in a variety of different communication protocols. In some embodiments, the network 225 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, or the like.

Figure 3A:
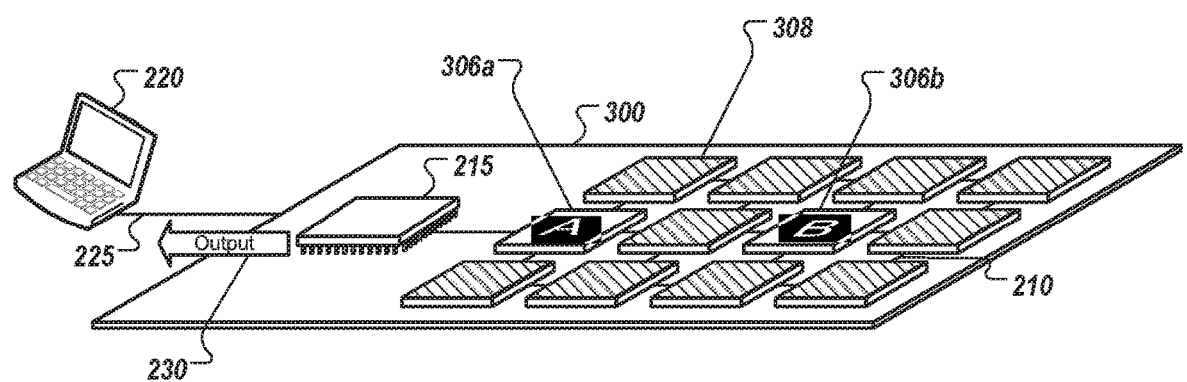
FIGS. 3A, 3B and 3C illustrates block diagram of another example sensing layer, and various operations thereof.
Figure 3B:
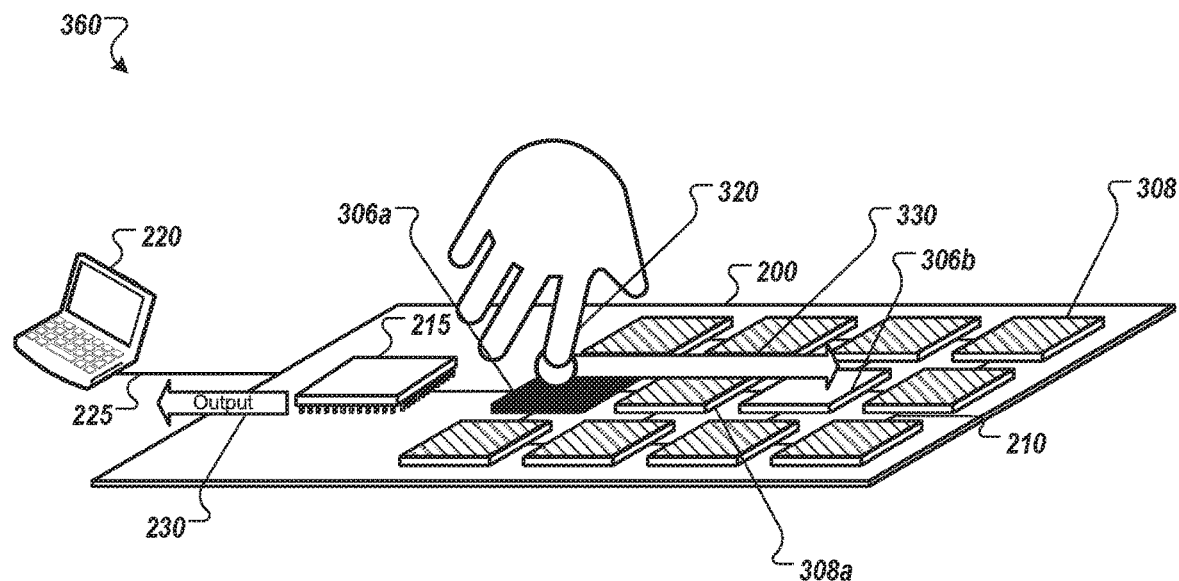
Figure 3C:
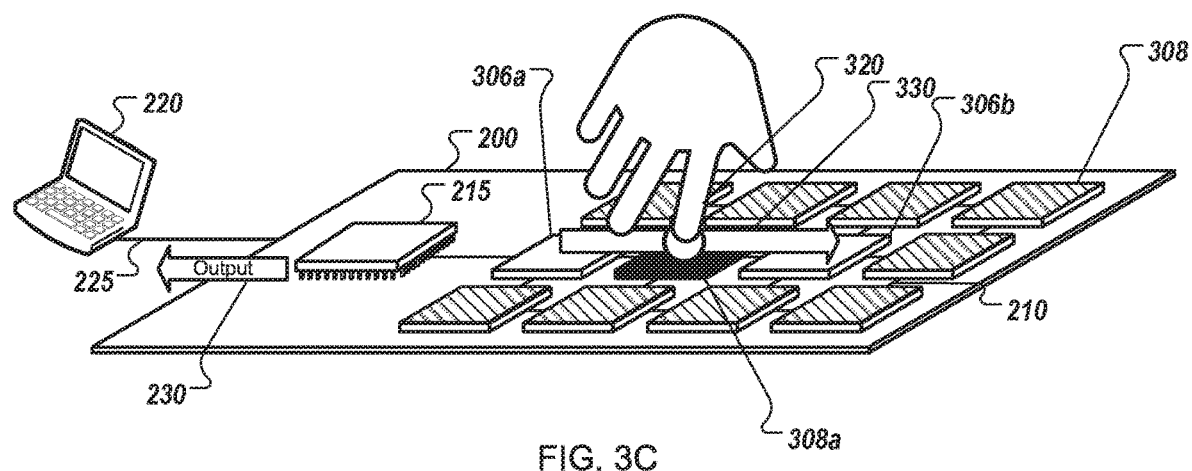

FIG. 3A illustrates block diagram of another example sensing layer 300. The sensing layer 300 may include similar components as the sensing layer 200 of FIG. 2. The sensing layer 300 may include one or more keyed sensing elements 306 and one or more interstitial sensing elements 308. The one or more keyed sensing elements 306 and one or more interstitial sensing elements 308 may be the same as or similar to the sensing elements 205 of FIG. 2. The one or more keyed sensing elements 306 may correspond to a respective one or more keys of a keyboard. The one or more interstitial sensing elements 308 may correspond to a respective area between keys of a keyboard. For ease in explanation, the one or more keyed sensing elements 306 are illustrated without shading and the one or more interstitial sensing elements 308 are illustrated with shading.

As illustrated, the sensing layer 300 may include an array of twelve sensing elements with two keyed sensing elements 306 and ten interstitial sensing elements 308. Any number of keyed sensing elements 306 and interstitial sensing elements 308 may be included in the sensing layer 300. The keyed sensing elements 306 and the interstitial sensing elements 308 may be any shape or size and may be arranged in any configuration. Any type of spacing scheme is contemplated. In at least one embodiment, the keyed sensing elements 306 and the interstitial sensing elements 308 may be arranged in accordance with a layout of a keyboard. For example, the keyed sensing elements 306 may correspond to a particular key on the keyboard. Each of the keyed sensing elements 306 that corresponds to a particular key may be arranged to substantially align with the respective key. For example, key "A" has a sensing element disposed 306a thereunder, and key "B" has a sensing element 306b disposed thereunder. The interstitial sensing elements 308 may be arranged between the keys of the keyboard and may be configured to receive user input that is not intended to active a particular key of the keyboard.

In an example, when a user actuates the key "A" with sufficient force or pressure, the pressure-sensing element 306a below the key "A" may detect the user input on the key "A". In response, the processor 215 transmits an output 230 signal representative of the key "A" to a client device 220. The processor 215 may be integrated or part of the HID. Similarly, if the user actuates the key "B" with enough force or pressure, the pressure-sensing element 306b below the key "B" may detect the user input on the key "B". In response, the processor 215 transmits an output signal 230 representative of the key "B" to the client device 220. Therefore, the user is able to operate the HID in this "keyboard mode" by actuating on one or more of discrete keys.

The interstitial sensing elements 308 may include pressure-sensing elements disposed between the discrete keys of the keyboard. As illustrated in FIG. 1, in the demarcated area of the keyboard, there are regions of space between and not part of any of the discrete keys. The interstitial sensing elements 308 may be disposed underneath these regions of space. Thus, the combination of the keyed sensing elements 306 and the interstitial sensing elements 308 are configured to detect user input on the demarcated area, including the regions of space both within and outside the discrete keys. For example, referring to FIGS. 3B and 3C, when a user touches a finger 320 at a point to the keyboard and performs a sliding action in a direction 330 across the demarcated area, such as to emulate a mouse cursor movement, the sensing elements 306a and 308a detect the force or pressure exerted by the user from the sliding action. The processor 215 then may transmit an output signal 230 to the client device 220 for performing the mouse cursor movement function. Therefore, the user is able to operate the HID in this "mouse mode" by performing actions within the demarcated area.

Figure 4A:
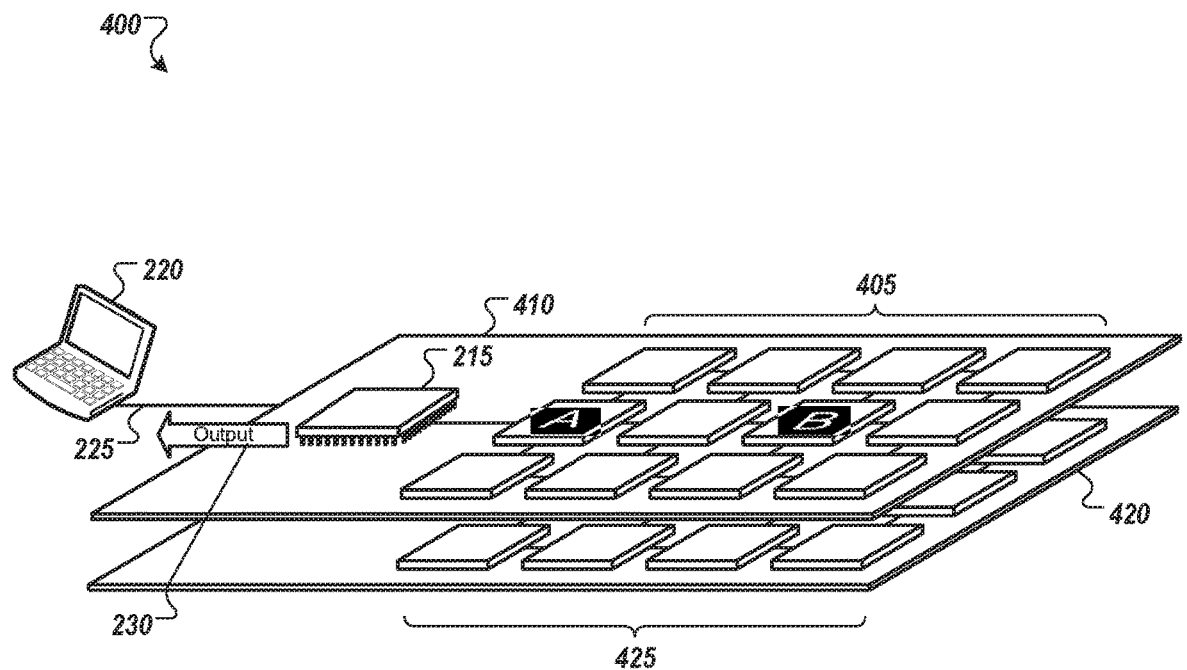
FIGS. 4A and 4B illustrate an example schematic of a double sensing layer HID.
Figure 4B:
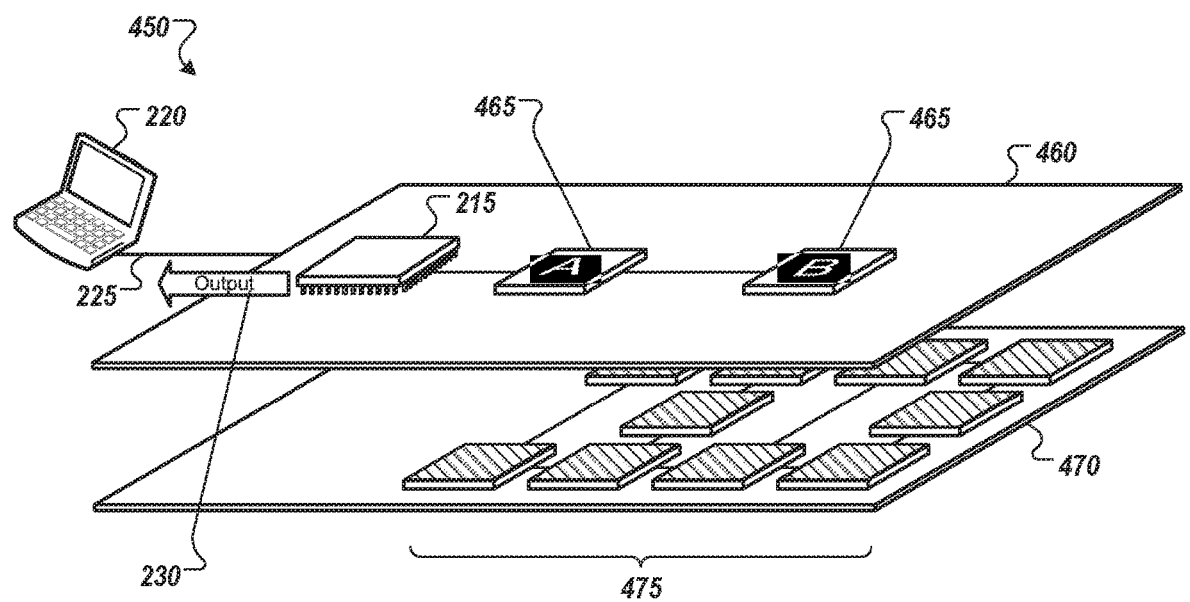

Referring to FIGS. 4A and 4B, in some other embodiments, an HID 400 may include multiple sensing layers disposed underneath a keyboard. For ease in explanation, the keyboard is omitted from FIGS. 4A and 4B. The sensing layers may be stacked together or arranged otherwise. As illustrated in FIG. 4A the HID 400 includes two sensing layers. The sensing layers may include similar components as the sensing layer 200 of FIG. 2. A first or upper sensing layer 410 may include multiple discrete sensing elements 405 (which may be the same as or similar to the sensing elements 205 of FIG. 2), each of which is disposed underneath a discrete key of the keyboard. A second or lower sensing layer 420 may also include multiple discrete sensing elements 425 (which may be the same as or similar to the sensing elements 205 of FIG. 2), each of which is disposed underneath a discrete key. Accordingly, under each discrete key is a pair of sensing elements. Further, on the lower sensing layer 420, there may be an additional set of interstitial sensing elements associated with the regions of space between the discrete keys, as described above. When a single sensing element is used for each discrete key, the applied pressure level may be used to determine either typing mode or gesture mode. In one scenario, the user may have to pre-determine a pressure level through a user settings menu. Different users may have different pressure level preferences. When sensing element pairs are used for each discrete key, the applied pressure level may not be required to determine either typing mode or gesture mode. Any number of sensing layers are contemplated. Although there are two or multiple pressure-sensitive layers illustrated in FIG. 4A, it would be apparent and readily understood by a skilled person that the multiple sensing layers can be consolidated into a single or singular physical layer, so as to maintain the slimness or size of the HID 400 for saving space.

Referring again to FIG. 4A, when a user actuates a key "A", a pair of sensing elements below the key "A" will detect the user input on the key "A". The key "A" needs to be actuated with a force level or pressure level that is sufficient to activate the sensing elements on both the upper and lower sensing layers 410, and 420. In response, the processor 215 may transmit an output signal 230 representative of the key "A" to the client device 220. Similarly, if the user actuates the key "B" with enough force or pressure, a pair of pressure-sensing elements below the key "B" will detect the user input on the key "B". In response, the processor 215 may transmit an output signal 230 representative of the key "B" to the client device 220. Therefore, the user is able to operate the HID, with multiple pressure-sensitive layers, in this "keyboard mode" by actuating on the set of keys.

FIG. 4B illustrates an embodiment of another example HID 450 of multiple sensing layers disposed underneath a keyboard. As illustrated in FIG. 4B, the HID 450 includes two sensing layers. A first or upper sensing layer 460 may include multiple discrete sensing elements 465 (which may be the same as or similar to the sensing elements 205 of FIG. 2), each of which is disposed underneath a discrete key of the keyboard. A second or lower sensing layer 470 may also include multiple discrete interstitial sensing elements 475 (which may be the same as or similar to the interstitial sensing elements 308 of FIG. 3), each of which is disposed between the keys "A" and "B" on the lower sensing layer 470. The interstitial sensing elements 475 may be configured to detect user input on the demarcated area, including the regions of space between the discrete keys. For example, when the user performs a sliding action across the demarcated area, such as to emulate a mouse cursor movement, the interstitial sensing elements 475 on the lower sensing layer 470 may detect force or pressure exerted by the user from that sliding action. The processor 215 may transmit an output signal 230 to the client device 220 to perform the mouse cursor movement function. Therefore, the user is able to operate the HID in this "mouse mode" by providing a touch-based gesture on or along or across the demarcated area.

In example or representative embodiments of the present disclosure, the HID is coupled or connected to a client device 220 for use or operation by a user. The sensing layer(s) may include sensing elements to detect user inputs on the keyboard, and the user inputs are subsequently transmitted by a processor 215 as output signals to the client device 220 to perform various functions. More specifically, the sensing elements are configured to detect various force or pressure levels. For example, if the user provides a user input at a first pressure level, e.g. a light touch on the keyboard, a first output signal would be transmitted to perform a first function on the client device 220. However, if the user provides a user input at a second pressure level, e.g. a heavier or stronger touch on the keyboard, a second output signal would be transmitted to perform a second function on the client device 220. By extension, if the user provides a user input at a third pressure level, e.g. an even heavier or stronger touch on the keyboard, a third output signal would be transmitted to perform a third function on the client device 220. This advantageously allows the user to provide multiple user inputs at a particular location on the keyboard by varying the pressure levels or force levels of the user inputs, thereby allowing the client device 220 to perform multiple functions based on the pressure level of the user inputs.

For ease in explanation, the sensing layers include sensing elements that are associated with or corresponds with the discrete keys (i.e. "A" and "B"). Additionally, there are interstitial sensing elements that are associated with or correspond to the regions of space between the discrete keys. In the "keyboard mode" or "typing mode", the user types or presses on the discrete keys to perform typing functions on the client device 220. Generally, when a user is typing on a keyboard, the force or pressure applied on each discrete key is slightly heavy or strong, i.e. at the second pressure level referred to above. Thus, user inputs on the discrete keys at the second pressure level would cause the sensing elements associated with the discrete keys to detect the user inputs. The processor 215 would then transmit output signals 230 to perform typing functions on the client device 220. In the "mouse mode", the user applies user input along or across the demarcated area of the keyboard, such as to mimic mouse cursor movements. This may be similar to a user using a conventional touchpad for mimicking mouse cursor movements. In such situations, the force or pressure applied on the demarcated area during such movements may be light, e.g. at the first pressure level referred to above. Thus, user inputs across the demarcated area at the first pressure level may cause the sensing elements underneath the demarcated area to detect the user inputs. The processor 215 may transmit output signals 230 to perform mouse functions on the client device 220. User inputs across the demarcated area (to perform mouse functions) may also extend across or otherwise contact the discrete keys (as illustrated in the layout in FIG. 1). As such, the sensing elements associated with the discrete keys may be configured to detect such user inputs. More specifically, on a sensing layer, the sensing elements associated with the discrete keys can detect user inputs at the first pressure level (e.g., light touch) for performing mouse functions, and also user inputs at the second pressure level (e.g., heavier touch) for performing typing functions.

In an embodiment as illustrated in FIG. 4A and FIG. 4B, the upper sensing layer 410 may include multiple sensing elements 405 that are associated with or corresponds with the discrete keys (i.e. "A" and "B"). The lower sensing layer 420 may include multiple sensing elements 425 that are associated with or correspond to the discrete keys. The lower sensing layer 420 additionally may include interstitial sensing elements 475 that are associated with or correspond to the regions of space between the discrete keys. In the "keyboard mode" or "typing mode", user inputs on the discrete keys at the second pressure level may cause the sensing elements associated with the discrete keys to detect the user inputs. The second pressure level is one of a heavier or stronger touch that may engage or activate the pressure-sensitive elements at both the upper and lower sensing layers. The processor 215 may then transmit an output signal 230 for performing typing functions on the computing device. In the "mouse mode", the force or pressure applied on the demarcated area of the keyboard during such movements may be light, e.g. at the first pressure level referred to above. User inputs across the demarcated area (for performing mouse functions) may also move across or otherwise contact the discrete keys (as shown in the layout in FIG. 1). As such, the sensing elements associated with the discrete keys (e.g. the sensing elements on the upper sensing layer) may be configured to detect such user inputs. However, as illustrated in FIG. 4B, the upper sensing layer 460 lacks sensing elements at the regions of space between the discrete keys. Such sensing elements are present at the lower sensing layer 470. Thus, as the user performs or mimics a mouse action across the demarcated area at the first pressure level (e.g., light touch), different sensing elements at both the upper and lower sensing layers may be engaged or activated, thereby causing the processor 215 to transmit an output signal 230 for performing mouse functions on the client device 220. Therefore, in this embodiment, the upper and lower sensing elements underneath the demarcated area (including the regions of space between the discrete keys) can detect user inputs at the first pressure level or range (e.g., light touch) for performing mouse functions. Further, the upper and lower sensing elements associated with the discrete keys can detect user inputs at the second pressure level (e.g., heavier touch) for performing typing functions.

It would be readily understood by a skilled person that other embodiments implementing different number of sensing layers and different number and/or positions of sensing elements are possible. The HID thus advantageously allows the user to perform different functions on the client device 220 by varying the pressure levels of the user inputs and the locations of the user inputs. For example, a heavier touch or press on the key "A" causes sensing elements associated with the key "A" to detect the downward force. Specifically, the sensing elements include vertical pressure displacement sensors for detecting the downward forces, thereby performing a typing function or action on the computing device. A lighter touch or movement between keys "A" and "B", or horizontal or lateral movement (for mimicking a mouse cursor movement) across a pathway on the demarcated area, causes sensing elements underneath the pathway to detect the horizontal or lateral movement. Specifically, the sensing elements include lateral pressure displacement sensors for detecting the horizontal or lateral movement, thereby performing a mouse function on the client device 220. Combinations of the possible detections of different force or pressure levels together with the locations or movements of user inputs on the demarcated area advantageously allows different user interactions and different functions to be performed on the client device 220.

Accordingly, the mouse functions can be performed by applying a light touch user input on the demarcated area of the keyboard, while the typing functions can be performed by applying a heavier touch user input on the discrete keys. The differential pressure levels advantageously prevents or reduces the risks of the user accidentally typing on a discrete key while mimicking a mouse cursor movement across the demarcated area, which overlaps some of the discrete keys. In other words, the risk of error is substantially reduced due to the HID's capability of detecting multiple pressure levels for different functions.

In various embodiments of the present disclosure, the HID may be configured to perform specialized functions on the computing device, wherein such functions are activated using specific or predetermined gestures on the keyboard. Thus, other than for performing mouse functions, other user inputs or movements on the keyboard of the HID can be configured to perform other functions (e.g. shortcuts, special functions, quick keys). An example of a gesture is a movement across the demarcated area in consecutive rightward and leftward directions, such as from key "A" to key "D" and vice versa. Other combinations of user gestures on the demarcated area will be readily apparent to the skilled person. These user gestures can be configured to perform special functions on the client device 220, such as key combinations or macros. An example of a special function is Ctrl-Alt-Del. Instead of pressing all 3 keys simultaneously which likely requires the use of 2 hands, the user can simply do a user gesture with 1 hand on the demarcated area to perform the same function.

Further, certain portions of the demarcated area can be mapped to perform specific functions on the client device 220. For example, as described above with reference to FIG. 1, the left end 125 of the spacebar key may be configured to emulate a left mouse button, and the right end 130 of the spacebar key may be configured to emulate a right mouse button.

A single discrete key can further be configured to perform different functions or trigger different events on the client device 220, depending on the pressure level applied thereon. For example, a key "A" can be configured to have 3 functions based on 3 pressure levels. User input on the key "A" at a first pressure level performs the function "A1" on the computing device; user input at a second pressure level performs the function "A2"; and user input at a third pressure level performs the function "A3". Other number of levels of functions for a single discrete key can be programmed or configured. The pressure level required for each of the functions can be predetermined or configured by the user to suit his preferences. For example, a smaller-sized user may consistently give a lighter touch to his user inputs as compared to a larger-sized user. At the same sensitivity settings for the pressure levels of the pressure-sensitive elements, the smaller-sized user may activate the function "A1" with his usual user input strength on the key "A", while the larger-sized user may activate the function "A2" with his usual user input strength on the key "A". However, both the smaller-sized and larger-sized users intend to activate the function "A1". Thus, it is advantageous for the user to configure the HID, specifically the sensitivities of the pressure levels, in order to cater or normalize to the input strength baselines of different individuals.

Multiple discrete keys can also be configured to be used in combinations, so as to perform more functions or trigger different events on the computing device. For example, user input on keys "A" and "B" simultaneously performs one function; and user input on keys "A" and "B" consecutively performs another function. Other different key combinations would be apparent to the skilled person. FIG. 1 shows a diagram of a number of discrete keys that may be configured for performing different functions on the client device 220. Therefore, the complementation of different key combinations with the different pressure levels advantageously allows users to perform various functions on the client device 220 based on location and pressure levels of the user inputs on the HID.

Accordingly, the HID is configured to be operable in "typing mode," "mouse mode" or "gesture mode." By performing various user inputs on the HID, the user can operate the HID in the different operation modes and switch between the operation modes seamlessly. Specifically, the user can perform typing and mouse functions on the same region of the keyboard (demarcated area), without having to shift his hand across a distance, as with a conventional laptop. Further, due to the presence of interstitial sensing elements at the regions of space between the discrete keys, gestures can be performed on the keyboard, and particularly anywhere on the keyboard, without being restricted to going over the discrete keys.

Figure 5:
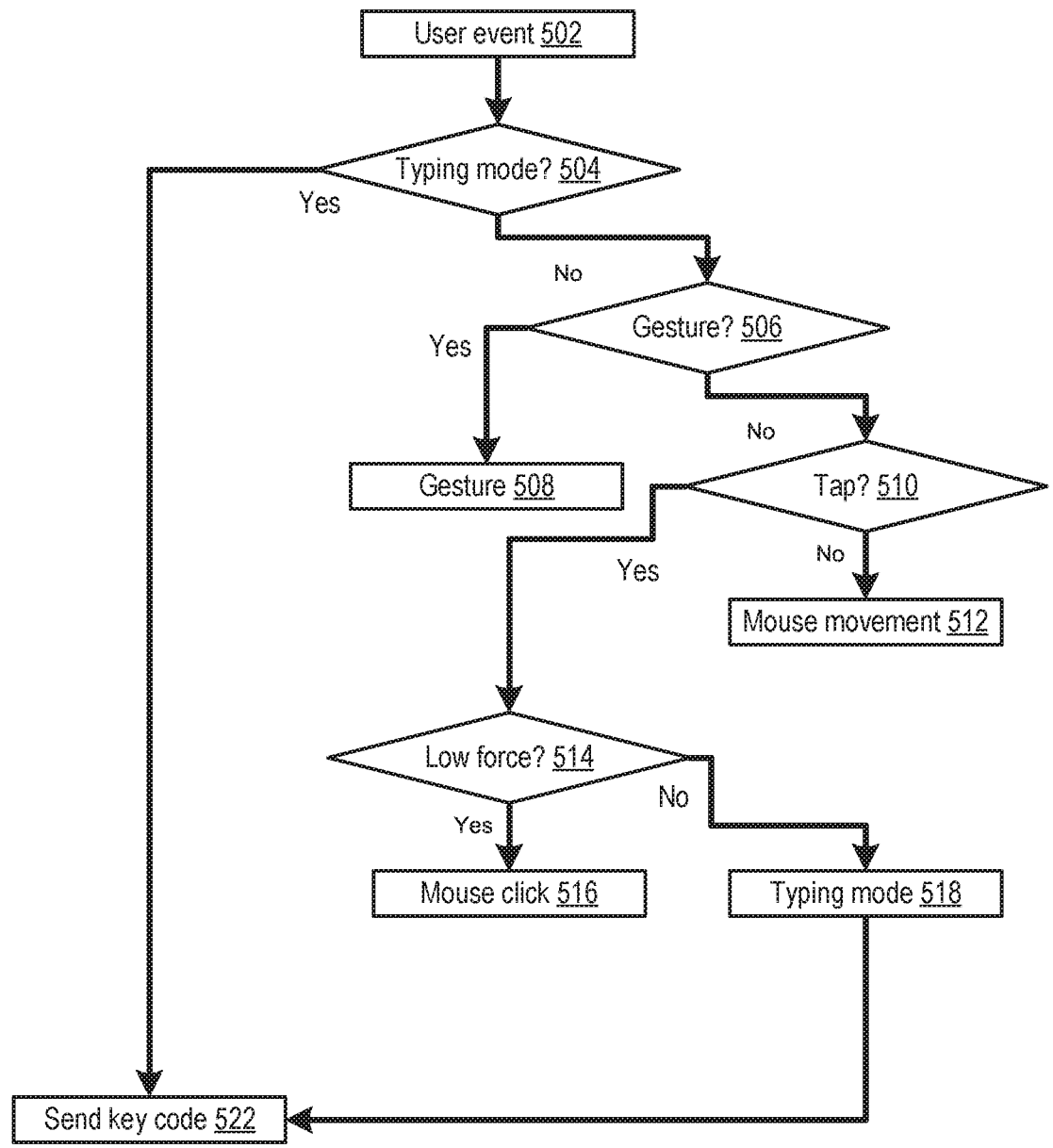
FIG. 5 illustrates a flow diagram of an example method to process various types of user inputs.

FIG. 5 illustrates a flow diagram of an example method performed by the processor 215 to process various types of user inputs or events and the operation modes of the HID. For example, the processor 215 processes the form of the user input, e.g. tapping or holding a key, the level of the force or pressure applied, and whether a gesture is being made on the HID. When any discrete key is pressed or activated as a user event trigger (user event 502), the processor may determine at block 504 whether to activate a typing mode or gesture mode. To determine whether to activate the typing mode or the gesture mode, for example, a higher force or pressure on the discrete key may correspond to the gesture mode as defined in a user setting, and a lower force or pressure on the discrete key may correspond to the typing mode. When activating the typing mode ("YES" at block 504), the processing logic may send a key code, based on which discrete key was pressed, to a display device at block 522. The display device in turn may display a character that corresponds to the key code.

When not activating the typing mode ("NO" at block 504), the processing logic may determine at block 506 whether the user event 502 corresponds to a gesture. If the gesture mode is selected, the processing logic may determine whether to activate mouse mode or true gesture mode (e.g., such as 2-touch pinch and zoom). When the user event 502 corresponds to a predefined gesture ("YES" at block 506), the processing logic may identify the gesture at block 508. The processing logic may cause a function based on the gesture to be performed.

When the user event 502 does not correspond to a predefined gesture ("NO" at block 506), the processing logic may determine at block 510 whether the user event 502 corresponds to a tap. When the user event 502 does not correspond to a predefined tap ("NO" at block 510), the processing logic may determine that the user event 502 corresponds to a mouse movement at block 512. The processing logic may execute a function that corresponds to the mouse movement.

When the user event 502 corresponds to a predefined tap ("YES" at block 510), the processing logic may determine at block 514 whether the user event 502 was a low force input. When the user event 502 corresponds to a low force input ("YES" at block 510), the processing logic may determine at block 516 that the user event 502 was a mouse click. The processing logic may execute a function that corresponds to the mouse movement.

When the user event 502 does not correspond to a low force input ("NO" at block 510), at block 518 the processing logic may enter the typing mode. The processing logic may send a key code, based on which discrete key was pressed, to a display device at block 522. In at least one embodiment, the processing logic may receive a predefined input (e.g., a hard tap) to change between modes (e.g., between gesture mode and typing mode).

According to an aspect of the present disclosure, there is provided a human interface device (HID) for a computing device. The HID comprises: a keyboard having a demarcated area and a set of discrete keys for user inputs thereon, at least some of the discrete keys and the demarcated area overlapping at a portion of the keyboard; and a pressure-sensitive layer disposed underneath the keyboard, the pressure-sensitive layer having a set of pressure-sensing elements for detecting a plurality of pressure levels from the user inputs on the keyboard. The user inputs on the keyboard activate the pressure-sensing elements for performing functions on the computing device; and the functions performable on the computing device are based on the pressure levels detected by the pressure-sensing elements.

In one embodiment, the user inputs comprise at least one of key presses and gestures on the keyboard. In one embodiment, the HID performs a first function based on user inputs at a first pressure level; and the HID performs a second function based on user inputs at a second pressure level. In one embodiment, the first function is a mouse function and the second function is a typing function. In one embodiment, at least one discrete key is configurable to have a plurality of functions, such that each function corresponds to a pressure level of the user inputs on the discrete key. In one embodiment, the pressure-sensitive layer is configured for detecting simultaneous user inputs on the keyboard. In one embodiment, the pressure-sensitive elements are configurable for adjusting sensitivity of the pressure levels to be detected thereby. In one embodiment, the demarcated area is configurable to be arranged at other portions of the keyboard. In one embodiment, the keyboard is configurable to omit the demarcated area. In one embodiment, the HID comprises a microcontroller for transmitting input signals to the computing device.

An advantage of the human interface device (HID) is that the physical topology of the HID enables detection of different and multiple pressure levels of the user inputs, thereby resulting in combinations of user inputs for performing different functions on the computing device. The detection of different pressure levels thus enables selection of different gestures for performing different functions.

A human interface device according to the present disclosure is thus disclosed hereinabove. Various features, aspects, and advantages of the present disclosure will become more apparent from the following detailed description of the embodiments of the present disclosure, by way of non-limiting examples only, along with the accompanying drawings in which like numerals represent like components.

In switching between the operation modes, if the default mode is the "keyboard mode" or "typing mode," the user can switch to another mode (e.g., the "mouse mode" or "touchpad mode") by using gestures on the keyboard. The horizontal or lateral gesture, for example, may cause the sensing elements, particularly a lateral pressure displacement sensor, to detect lateral pressure displacement of the gestures. In response to this detection, the processor 215 may process the detection as the user intending to use the HID as a conventional mouse, thereby causing the HID to switch from "keyboard mode" to "mouse mode." On the other hand, the user can switch back to "keyboard mode" by tapping or typing actions on at least one discrete key of the keyboard. The tapping or typing actions cause the sensing elements, particularly the vertical pressure displacement sensors, to detect vertical pressure displacement of the discrete keys. In response to this detection, the processor 215 may process the detection as the user intending to use the HID as a conventional keyboard, thereby causing the HID to switch to "keyboard mode."

In at least one embodiment, a HID includes a keyboard having multiple discrete keys and a demarcated area. The discrete keys may be collectively referred to as a keys zone and the demarcated area may be referred to as a touchpad zone. In an example illustrated in FIG. 1, the touchpad zone overlaps a substantial portion of the keys zone. Some of the discrete keys from the keys zone may be disposed outside of the touchpad, e.g. the "caps lock", "shift", and "tab" keys. These keys are normally positioned at the peripheral of the keyboard and may not interfere with the operation of the touchpad zone. The keys zone is configured to detect user input on each of the discrete keys, and the touchpad zone is configured to detect user input in the form of mouse actions or gestures. In some embodiments, the keyboard is configured to detect discrete user inputs, e.g., keys can be pressed one at a time. In other embodiments, the keyboard is configured to detect simultaneous discrete user inputs, e.g., multiple keys may be pressed at the same time. Examples of pressing of multiple keys simultaneously include using alternate functions like "Shift", "Alt", and "Ctrl." User inputs on multiple keys simultaneously may also allow the user to create more custom combinations and gestures, thereby performing more types of functions on the client device 220.

The layout in FIG. 1 illustrates an example of an arrangement of the keys zone and the touchpad zone on the keyboard. Other arrangements of the keys zones and the touchpad zone are possible, as would be readily apparent to the skilled person. The keyboard of the HID is configurable by the user for changing the arrangement.

Figure 6A:
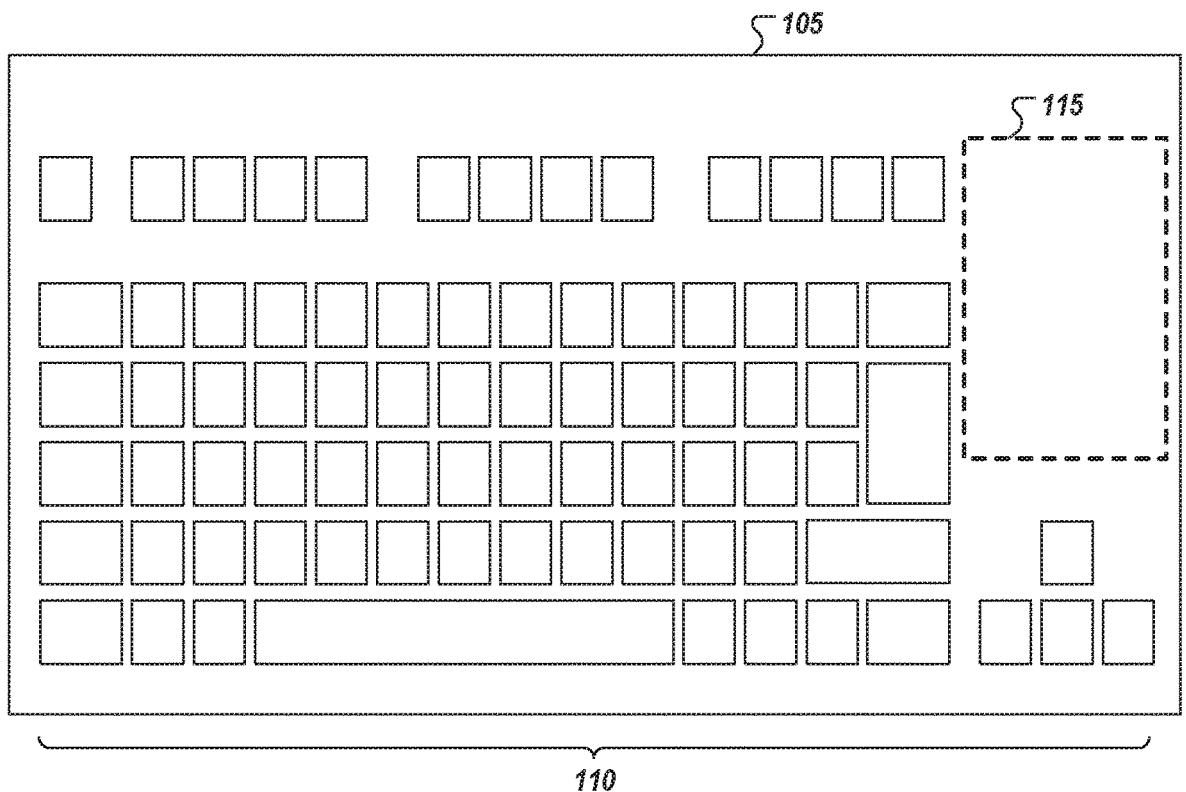
FIGS. 6A, 6B and 6C illustrates other possible arrangements of the keys zone and the touchpad zone on the keyboard.
Figure 6B:
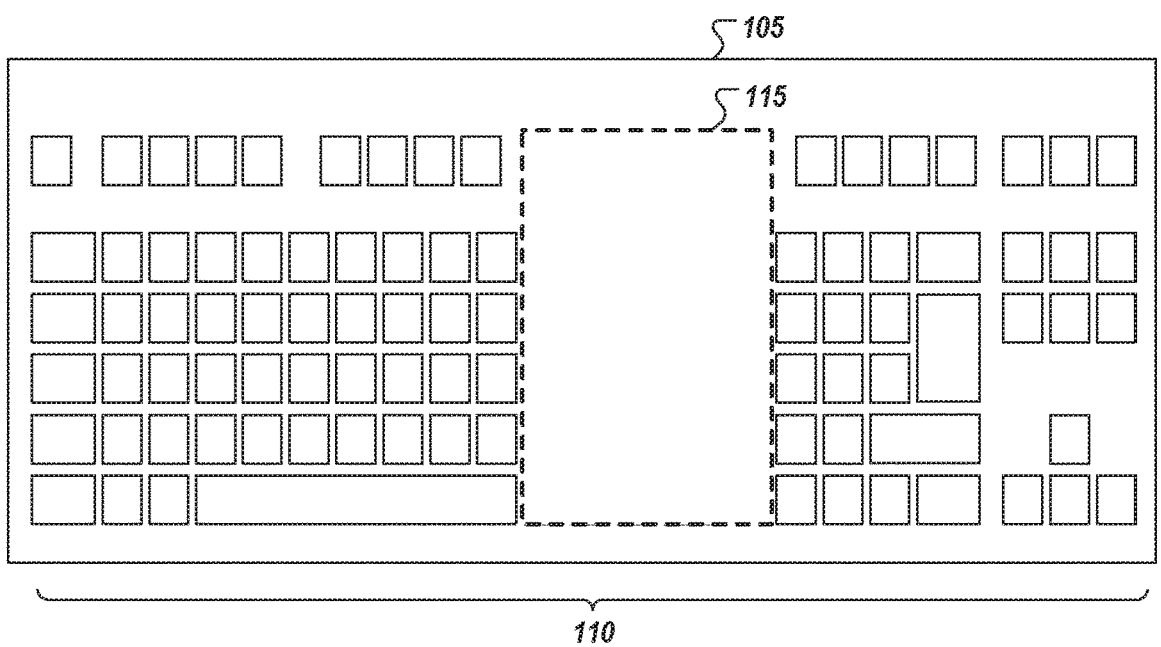
Figure 6C:
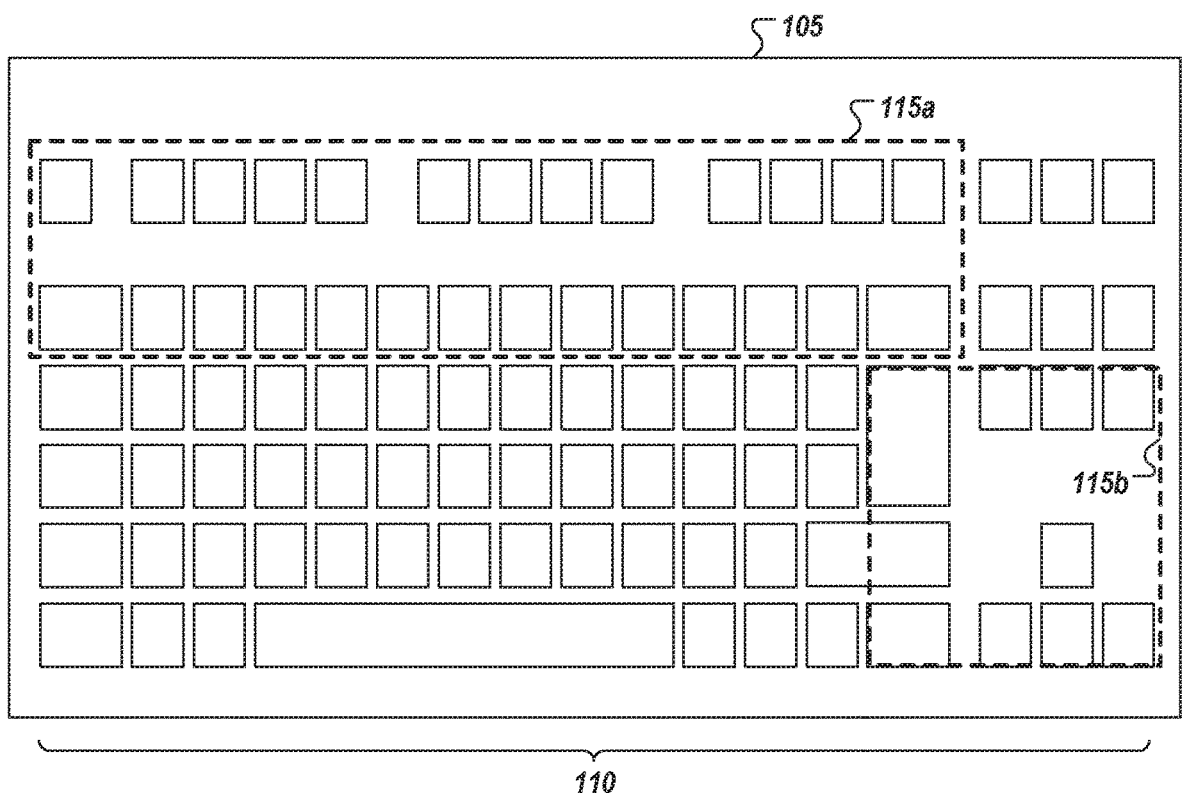

FIGS. 6A, 6B and 6C illustrates other possible arrangements of the keys zone and the touchpad zone on the keyboard. Further, the user can configure multiple touchpad zones on the same keyboard, such as having touchpad zones on both the left and right sides of the keyboard. This could be to allow ambidextrous users to use the touchpad zones and mouse functions more efficiently. The touchpad zone can also be configured to be of an odd shape to suit the user's preferences, or for avoiding commonly used keys. By arranging the touchpad zone over or to overlap less commonly used keys, the space on the keyboard is more effectively utilized. Alternatively, for users who prefer to use the HID purely in "typing mode", the touchpad zone can be configured to be a "none area", i.e. there is no touchpad zone on the keyboard. The HID may include functionality for the user to selectively alter the size of the touchpad zone of the keyboard. For example, the user may enter a touchpad zone size mode during which the user may select or deselect portions of the touchpad zone to increase or decrease the size of the touchpad zone. In at least one embodiment, the user may using a finger or stylus to "draw" the touchpad zone. The HID may thus receive input to selectively size the touchpad zone. There are other combinations and arrangements of the keys zone and touchpad zone on the keyboard, as readily apparent to the skilled person.

Therefore, the HID in accordance with embodiments of the present disclosure is a composite or hybrid input device that integrates the functions of conventional keypads, keyboards, mousepads, and touchpads. Through the use of various forms of user inputs on the HID and sensing elements configured to detect multiple pressure levels, the HID advantageously enables seamless activation and transition between the various operation modes. The various operation modes include "keyboard mode" for key typing, "mouse mode" for mouse-related functions, and "gesture mode" for detecting user gestures on the HID. The user can effectively control the different operation modes and functions based upon the form of user input and the force or pressure applied on the HID. Variations and modifications can be made to the HID, as understood by the skilled person. For example, the keyboard can be configured to provide haptic feedback to the user when they are providing user inputs on the keyboard. Alternatively, the keyboard may be perforated with illumination elements for providing lighting on the keyboard.

Figure 7:
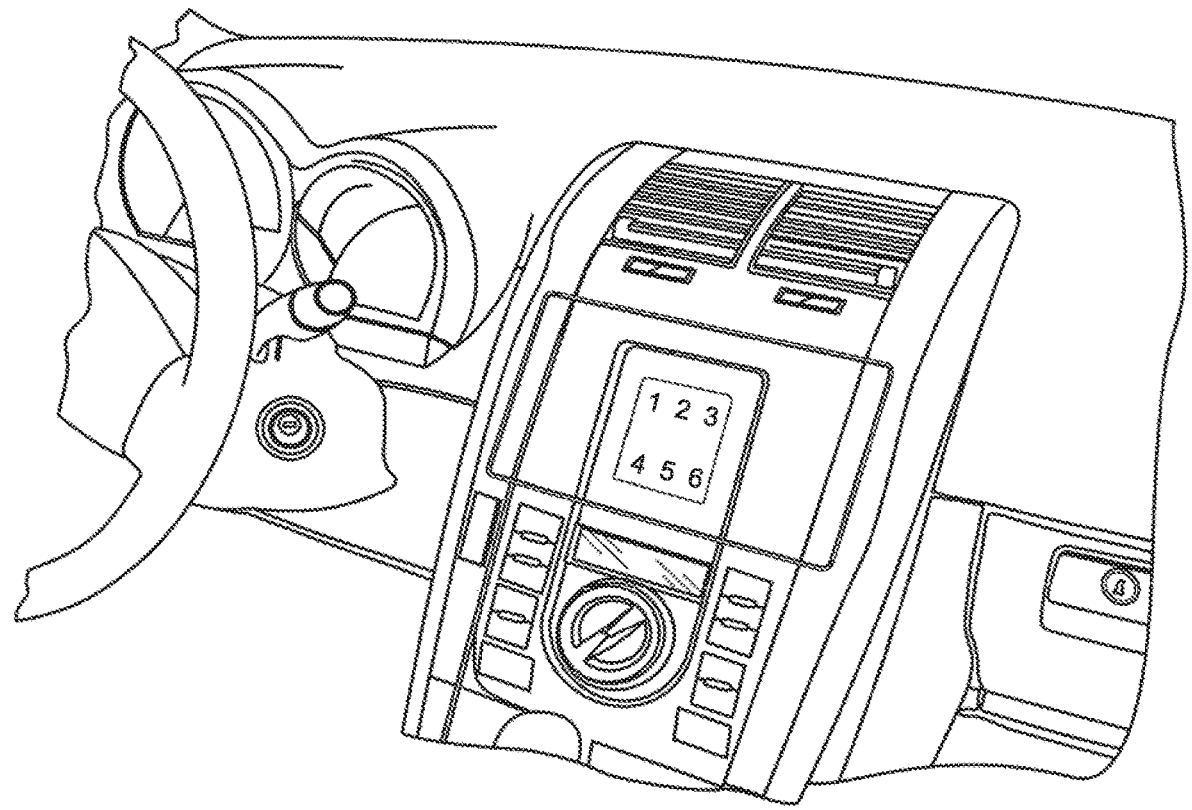
FIG. 7 illustrates another example implementation of the HID.

The HID may be implemented or integrated in various products or in existing products such as touchpads and/or keypads in automotive vehicles, such as that as shown in FIG. 7. Alternatively, the HID may be implemented as a standalone product or portable product that integrates keyboard and touchpad functions in a single composite or hybrid input device.

Figure 8:
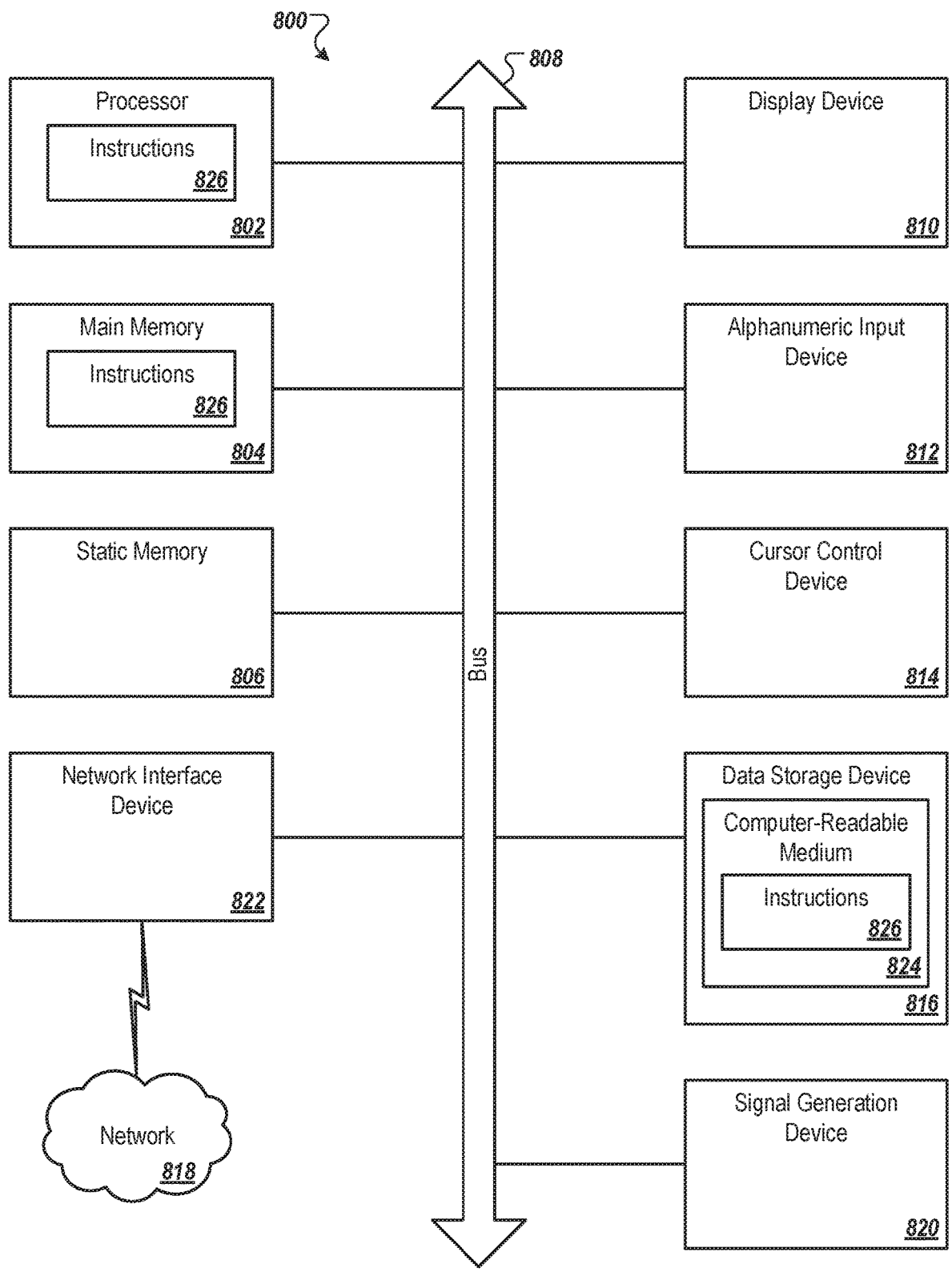
FIG. 8 illustrates a diagrammatic representation of a machine in the example form of a computing device within which a set of instructions, for causing the machine to perform any one or more of the methods discussed herein, may be executed.

FIG. 8 illustrates a diagrammatic representation of a machine in the example form of a computing device 800 within which a set of instructions, for causing the machine to perform any one or more of the methods discussed herein, may be executed. The computing device 800 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 800 includes a processing device (e.g., a processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)) and a data storage device 816, which communicate with each other via a bus 808.

Processing device 802 represents one or more general-purpose processing devices such as a microprocessor, central processing unit, or the like. More particularly, the processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also include one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computing device 800 may further include a network interface device 822 which may communicate with a network 818. The computing device 800 also may include a display device 810 (e.g., a liquid crystal display (LCD) or a cathode ray tube (CRT)), an alphanumeric input device 812 (e.g., a keyboard), a cursor control device 814 (e.g., a mouse) and a signal generation device 820 (e.g., a speaker). In one implementation, the display device 810, the alphanumeric input device 812, and the cursor control device 814 may be combined into a single component or device (e.g., an LCD touch screen).

The data storage device 816 may include a computer-readable storage medium 824 on which is stored one or more sets of instructions 826 embodying any one or more of the methods or functions described herein. The instructions 826 may also reside, completely or at least partially, within the main memory 804 and/or within the processing device 802 during execution thereof by the computing device 800, the main memory 804 and the processing device 802 also constituting computer-readable media. The instructions may further be transmitted or received over a network 818 via the network interface device 822.

While the computer-readable storage medium 826 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range, for instance, within +/−20%, +/−15%, +/−10%, +/−5%, or +/−0%. With respect to recitations herein directed to dimensional or numerical comparisons or equivalence, reference to the terms "generally,"

"approximately," or "substantially" is understood as falling within +/−20%, +/−15%, +/−10%, +/−5%, or +/−0% of a representative or example comparison, or a specified or target value or value range; and reference to the term "essentially" is understood as falling within +/−10%, +/−5%, +/−2%, +/−1%, or +/−0% of a representative or example comparison, or a specified or target value or value range.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in An Introduction to Mathematical Reasoning: Numbers, Sets, and Functions, "Chapter 11: Properties of Finite Sets" (e.g., as indicated on p. 140), by Peter J. Eccles, Cambridge University Press (1998)). In general, an element of a set can include or be a system, an apparatus, a device, a structure, an object, a process, a physical parameter, or a value depending upon the type of set under consideration.

In the foregoing detailed description, embodiments of the present disclosure in relation to a human interface device are described with reference to the provided figures. The description of the various embodiments herein is not intended to call out or be limited only to specific or particular representations of the present disclosure, but merely to illustrate non-limiting examples of the present disclosure. The present disclosure serves to address at least some of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure.

The invention claimed is:

1. A system, comprising:
   a memory;
   a processor operatively coupled to the memory;
   a pressable surface having a first area provided thereon when in a first mode, the pressable surface showing a plurality of discrete keys disposed along the pressable surface in the first area; and
   a first sensing layer disposed underneath the pressable surface and operatively coupled to the processor, the first sensing layer being configured to sense force applied to the pressable surface,
   wherein the processor is configured to:
      identify a first force input from the first sensing layer that corresponds to one of the plurality of discrete keys, and
      identify, from the first sensing layer, a second force input applied to the pressable surface that corresponds to a second mode.

2. The system of claim 1, wherein each of the plurality of discrete keys are defined by a discrete marking at the pressable surface.

3. The system of claim 1, wherein the second mode is related to a gesture-based function.

4. The system of claim 1, wherein each of the plurality of discrete keys are projected to the pressable surface.

5. The system of claim 1, wherein the plurality of discrete keys comprises a first key, wherein the first sensing layer comprises a first sensing element, wherein the first sensing element is configured to detect force on the pressable surface that corresponds to the first key.

6. The system of claim 5, wherein the processor is further configured to identify an alphanumeric character that corresponds to the first key based on receiving the first force input from the first sensing element.

7. The system of claim 6, wherein the first mode corresponds to a typing mode, wherein the processor is further configured to identify the second mode based on receiving the second force input from the first sensing element while in the first mode.

8. The system of claim 6, wherein the first sensing layer comprises a first interstitial sensing element that is disposed between the first sensing element and a second sensing element, wherein the processor is further configured to identify the first mode based on receiving the first force input from the first sensing element and a third force input from the first interstitial sensing element.

9. The system of claim 8 further comprising a second sensing layer disposed below the pressable surface and the first sensing layer, the second sensing layer comprising a third sensing element that is substantially aligned with the first sensing element such that the third sensing element is configured to identify force applied to the first sensing element, wherein the processor is configured to identify the alphanumeric character that corresponds to the first key based on receiving the first force input from the first sensing element and a third force input from the third sensing element.

10. The system of claim 1 further comprising a haptic driver to provide haptic feedback via the pressable surface responsive to the first force input.

11. The system of claim 1, wherein the processor is configured to determine various functions based on different force levels detected by the first sensing layer.

12. The system of claim 1, wherein the user input comprises at least one of a press or a touch gesture.

13. A method, comprising:
   identifying a first force input from a sensing layer in response to a user input on a pressable surface, the pressable surface having a first area and, when in a first mode, the pressable surface showing one or more components at the pressable surface, the one or more components relating to the first mode, wherein the sensing layer is disposed below the pressable surface;
   determining a first function based on the first force input;
   causing the first function to be provided at a client device;
   identifying, from the sensing layer, a second force input applied to the pressable surface;
   determining a second function that corresponds to the second force input; and
   causing the second function to be provided at the client device.

14. The method of claim 13, wherein the first function pertains to the presentation of an alphanumeric character on the display of the client device, wherein causing the first function to be provided at the client device comprises causing the alphanumeric character to be presented on the display of the client device.

15. The method of claim 13, wherein the second function pertains to a gesture-based function, wherein causing the second function to be provided at the client device comprises causing the client device to perform the gesture-based function.

16. The method of claim 15, wherein the gesture-based function includes at least one of: a vertical scroll, a horizontal scroll, a click, or a click-and-drag.

17. The method of claim 13 further comprising:

identifying a third force input on the pressable surface, wherein the third force input is simultaneously identified with the first force input;

determining a third function based on the first force input and the third force input; and causing the third function to be executed at the client device.

18. The method of claim 13 further comprising receiving a configuration request to set the first area on the pressable surface.

19. A system, comprising:

a memory;

a processor operatively coupled to the memory;

a pressable surface having a first area and showing a plurality of sub-areas, the plurality of sub-areas each being configured to receive user input, wherein at least a portion of the plurality of sub-areas overlap the first area; and a sensing layer disposed underneath the pressable surface and operatively coupled to the processor, the sensing layer being configured to sense force applied to the pressable surface in response to the user input, wherein the processor is configured to:

identify a first force input from the sensing layer that corresponds to a first function, and identify, from the sensing layer, a second force input applied to the pressable surface that corresponds to a second function.

20. The system of claim 19, wherein in the first force input and the second are associated with a first area of the plurality of sub-areas, wherein the first force input is larger in magnitude than the second force input.

* * * * *